United States Patent [19]

Hall

[11] Patent Number: 4,797,652
[45] Date of Patent: Jan. 10, 1989

[54] STATUS REGISTER BIT AND DELTA

[75] Inventor: Christopher M. Hall, Mountain View, Calif.

[73] Assignee: National Semiconductor Corporation, Santa Clara, Calif.

[21] Appl. No.: 26,715

[22] Filed: Mar. 17, 1987

Related U.S. Application Data

[63] Continuation of Ser. No. 607,545, May 7, 1984, abandoned.

[51] Int. Cl.[4] .......................... G05B 1/00; G06F 7/02; G06F 7/38
[52] U.S. Cl. ............................... 340/146.2; 364/736.5
[58] Field of Search ..................... 340/146.2; 364/715

[56] References Cited

U.S. PATENT DOCUMENTS

| | | | |
|---|---|---|---|
| 3,288,987 | 11/1966 | Amato | 340/146.2 |
| 3,479,644 | 11/1969 | Spaid | 340/146.2 |
| 3,538,316 | 11/1970 | Barrett et al. | 340/146.2 |
| 3,662,339 | 5/1972 | Tyler, II et al. | 340/146.2 |
| 3,845,465 | 10/1974 | Hosick et al. | 340/146.2 |
| 4,007,439 | 2/1977 | Semmelhaack et al. | 340/146.2 |
| 4,119,946 | 10/1978 | Taylor | 340/146.2 |
| 4,524,345 | 6/1985 | Sybel et al. | 340/146.2 |
| 4,567,572 | 1/1986 | Morris et al. | 340/146.2 |
| 4,613,980 | 9/1986 | Newbun et al. | 340/146.2 |

Primary Examiner—Gary V. Harkcom
Assistant Examiner—Dale M. Shaw
Attorney, Agent, or Firm—Gail W. Woodward; Lee Patch; Mark Aaker

[57] ABSTRACT

A unique circuit that unambiguously provides an output status bit and an output delta bit in response to an input data signal. This circuit does not require the use of a one shot. The circuit includes a first latch which latches the last status value, and an exclusive OR gate for comparing the previous input data value with the present input data value and provides an output data signal indicating whether change in the input data has occurred. If the exclusive OR gate indicates that a change in input data has occurred since the previous read, the new value of the input data is provided as an output status signal. Conversely, if the exclusive OR gate indicates that a change in the input signal has not occurred, the previous value of the input signal stored by the circuit is provided as an output status signal. Additional latches, which close at the onset of a read cycle, prevent either the delta bit or the status bit from changing during the read cycle. Another latch is set by the output status signal from the exclusive OR gate when the input data changes, and is only cleared by an actual read of delta bit which indicates that a change in input data has occurred, so a change in input data cannot be missed. A reset line initializes the circuit by clearing the latches and latching the present input data value into the location where the previously read input data value was stored.

2 Claims, 4 Drawing Sheets

STATUS REGISTER BIT AND DELTA

This is a continuation of application Ser. No. 607,545, filed May 7, 1984, which is now abandoned.

BACKGROUND OF THE INVENTION

This invention relates to electronic circuits and more particularly to an electronic circuit which receives an input data signal and provides an output status bit indicative of the state of the input data signal received, and also provides an output delta bit which indicates whether the preset input data signal is the same as the input data signal received immediately previous to the present input data signal.

Prior art circuits for providing a status bit and a delta bit are known. One such prior art circuit utilizing a monostable multivibrator ("one shot") is shown in the schematic diagram of FIG. 1. The prior art circuit shown in FIG. 1 is used to provide a data status bit D' on output terminal 18 and a delta bit Δ on output terminal 19 in response to asynchronous data signal "D". The Delta signal (Δ) defines whether the present input data signal D is different from the previous input data signal (Δ=1), or whether the present input data signal D is the same as the previous input data signal (Δ=0). Status bit D' is equal to the present input data signal D. This information is made available to other circuitry (not shown).

In the circuit of FIG. 1, the input data signal D is read directly through the three state output buffer 16 when buffer 16 is enabled by a logical one READ enable signal applied to terminal 20. Input data signal D also is applied to the input leads of one-shots 12 and 13, each of which generates a pulse for the signal edge indicated in FIG. 1. In other words, one shot 12 provides a positive output pulse in response to each rising edge of input data signal D; one shot 13 provides a positive output pulse in response to each falling edge of input data signal D. OR gate 14 receives on its input leads the output signals from one shots 12, 13 and provides an output signal which is applied to the SET input lead of RS latch 15. RS latch 15 is reset by a logical one READ enable signal applied to terminal 20. The Q output lead of RS latch 15 is connected to the data input lead of three state buffer 17, which is enabled by a logical one READ enable signal on terminal 20. Thus, when input data signal D changes state from a logical one to a logical zero, or vice versa, a logical one pulse is provided by either one shot 12 or one shot 13 to OR gate 14, which in turn provides a logical one output pulse, causing RS latch 15 to store a logical one delta bit, indicating that the present input data signal D differs from the previous input data signal.

The schematic diagram of a typical one shot suitable for use in the circuit of FIG. 1 is shown in FIG. 2. One shot 20 includes input terminal 21 for receiving an input signal, and output terminals 27 and 29. Output terminal 27 provides a positive going pulse in response to a high to low transition of the input signal applied to input terminal 21. Conversely, output terminal 29 provides a negative going pulse in response to a low to high transition of the input signal applied to input terminal 21.

There are many disadvantages to using a one shot. Most of these can be ascribed to the variability of the delay provided by the one shot leading to an attendant lack of reliability. A one shot compares an input signal with a delayed version of itself, generating an output pulse only as long as that delay holds after the signal undergoes a given edge transition (i.e., rising edge or falling edge). This delay is often based on a number of inverter stages and/or a resistor and capacitor combination which causes the capacitor to charge up with an RC delay. However, process variations during manufacture of the one shot, such as variations in the speed of the inverter stages, variations in transistor characteristics, variations in resistor and capacitor values, variations in capacitor leakage, and the like, cause this delay to vary. Temperature, humidity, and voltage supply range also affect the delay. If the delay becomes too short, the pulse may decrease in width (time) or height (voltage), or even vanish altogether, causing any circuit relying on that pulse to fail to operate properly. Conversely, if the one shot delay is excessively long, it will extend unwanted into a later timing period. One shots are sometimes used to provide a relatively long output pulse in response to a relatively short input pulse, and they are thus very susceptible to error caused by noise. Since the one shot fires its output pulse immediately, it is also possible that some circuit further along may not be ready for it, and will thus miss the output pulse altogether.

Another problem exists with the prior art circuit of FIG. 1. When three state buffers 16, 17 are enabled during a read operation (status bit D' and delta bit Δ being read by external circuitry connected to terminals 18 and 19, respectively) and asynchronous input data signal D changes during this read operation then the corresponding data bus status bit D' changes, passing an undefined value (e.g., a voltage level between the voltage levels associated with a logical one and a logical zero) to the external circuitry. Furthermore, when three state buffers 16, 17 are latched, a race condition may result: when input data signal D changes shortly before a logical one READ signal, the new value of input data signal D passes through three state latch 16, while the new delta signal (which must equal one) may not yet be generated by one shots 12, 13, OR gate 14, and latch 15. Then, a delta=0 signal is provided on output terminal 19, indicating no change in input data, while the new (changed data signal D is provided on output terminal 18, creating a contradiction. Furthermore, if input data signal D changes during a read operation, RS latch 15 is still being reset by the READ signal. Then, since the one shot pulses have already been generated, during the next read operation, the delta bit is a logical zero (no change) and the data status bit D' is the new input data signal D, a contradiction.

Accordingly, prior art status register and delta circuits have been found to be unsatisfactory.

SUMMARY

In accordance with the teachings of this invention, a unique circuit provides an output status bit and an output delta bit in response to an input data signal, and allows these output signals to be read unambiguously. The circuit of this invention eliminates many problems of prior art circuits by not requiring the use of a one shot. The circuit includes a first latch which latches the last status value, and an exclusive OR gate for comparing the previous input data value with the present input data value and provides an output data signal indicating whether change in the input data has occurred. If the exclusive OR gate indicates that a change in input data has occurred since the previous read, the new value of the input data is provided as an output status signal.

Conversely, if the exclusive OR gate indicates that a change in the input signal has not occurred, the previous value of the input signal stored by the circuit is provided as an output status signal. Additional latches, which close at the onset of a read cycle, prevent either the delta bit or the status bit from changing during the read cycle. Another latch is set by the output status signal from the exclusive OR gate when the input data changes, and is only cleared by an actual read of delta bit which indicates that a change in input data has occurred, so a change in input data cannot be missed. A reset line initializes the circuit by clearing the latches and latching the present input data value into the location where the previously read input data value was stored.

DETAILED DESCRIPTION

Figure 1:
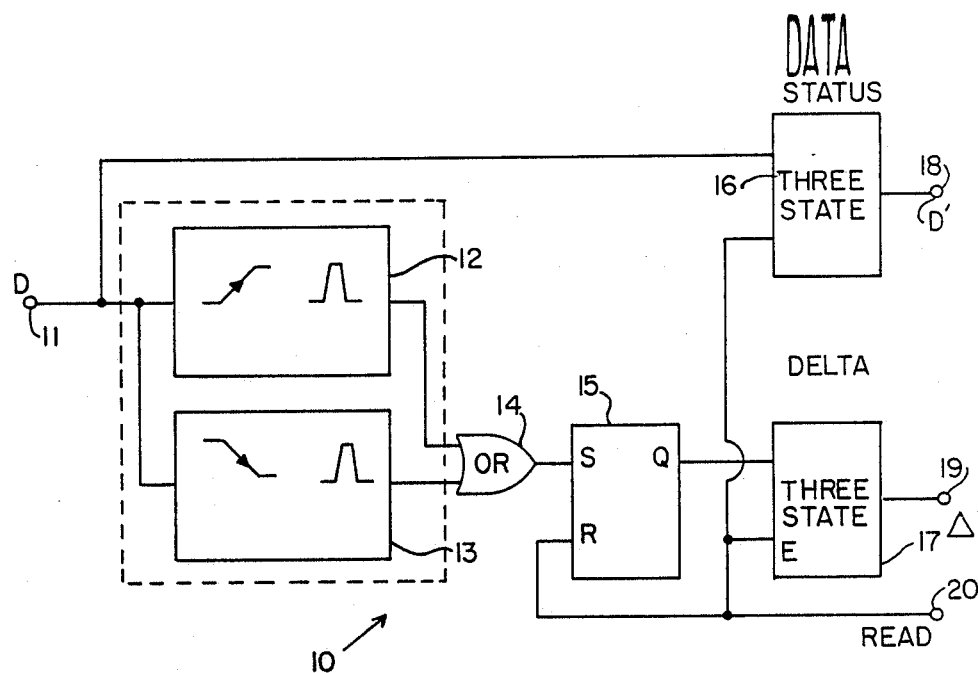
FIG. 1 is a schematic diagram of a prior art status register and delta circuit.
Figure 2:
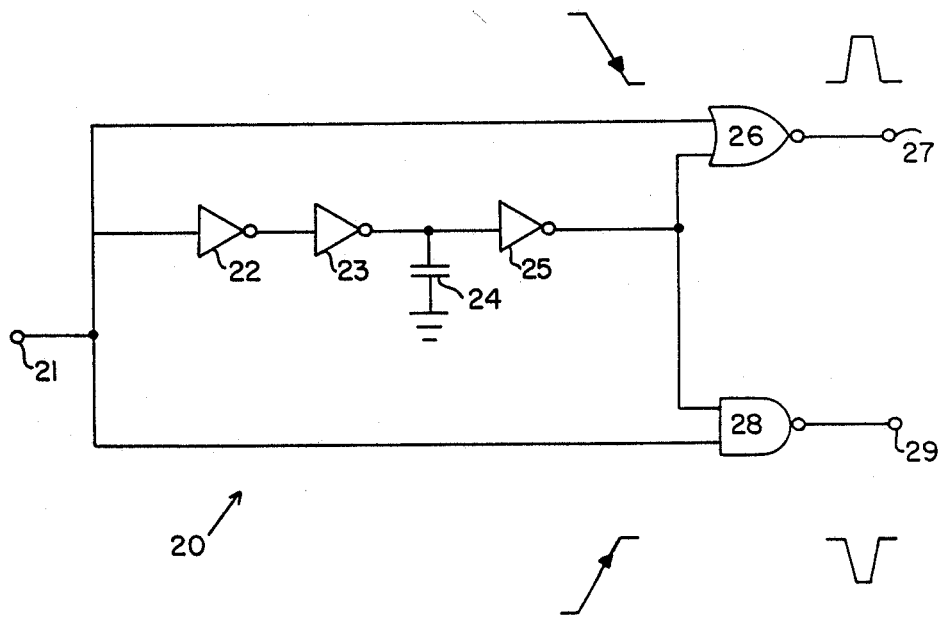
FIG. 2 is a schematic diagram of a typical one shot as used in the prior art circuit of FIG. 1.
Figure 3:
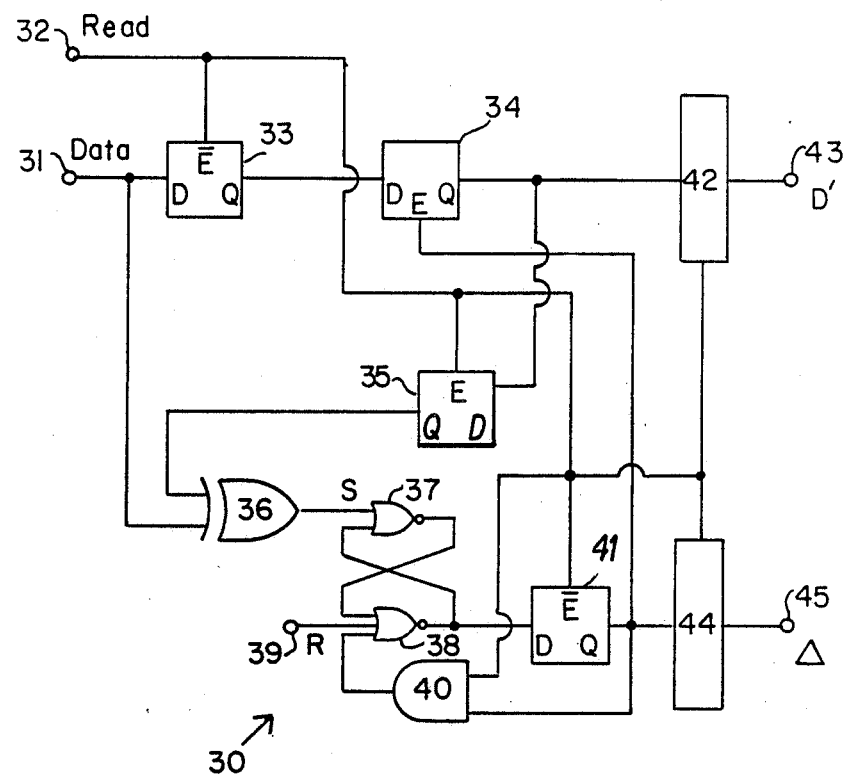
FIG. 3 is a block diagram depicting one embodiment of the present invention.

FIG. 3 depicts a circuit 30 constructed in accordance with one embodiment of this invention. Circuit 30 includes input terminal 31 for receiving an input data signal which, for example, is a single binary digit having a value of either a logical 0 or a logical 1. Input terminal 32 receives a logical one READ signal indicating when the input data signal applied to input terminal 31 should be read out, together with the delta bit, on the output terminals. Circuit 30 also includes a status bit output terminal 43 for providing an output status signal D' which is equal to the input data signal received on input terminal 31, and a delta bit output terminal 45 which provides a delta output signal Δ which has a value of logical 1 when the present input data signal received on input terminal 31 differs from the most recent previous input data signal received on input terminal 31. Conversely, the value of the delta output signal on output terminal 45 is a logical 0 when the present input data signal on input terminal 31 is identical to the previous value of input data signal received on input terminal 31.

Latches 33, 34, 35, and 41 each comprise a single bit latch which are suitable for storing a single binary digit. Latches 33, 34, 35, and 41 allow data applied to their input lead to fall through to their output lead when enabled, and retain this data when not enabled. Latches 33 and 41 are enabled in response to a logical zero $\overline{en}$ able signal; latches 34 and 35 are enabled in response to a logical one enable signal. Latch 33 has its D input lead connected to input terminal 31 for receiving the input data signal, and its enable input lead $\overline{E}$ connected to input terminal 32 for receiving the READ signal. Thus, each input data signal applied to input terminal 31 is provided on the Q output lead of latch 33 when the READ signal is inactive (logical 0), and is stored in latch 33 in response to a logical one READ signal received on terminal 32. The output signal provided on the Q output lead of latch 33 is connected to the D input lead of latch 34, and the enable input lead E of latch 34 is connected to the Q output lead of delta signal latch 41, thereby causing the information stored in latch 33 to fall through latch 34 and be provided on the Q output lead of latch 34 in response to a logical one delta signal on the Q output lead of latch 41. Conversely, when latch 41 provides a logical zero delta signal on its Q output lead, latch 34 remains inactive and continues to store the previous input data from latch 33. The Q output lead from latch 34 is in turn connected to the D input lead of latch 35, and the enable input lead E of latch 35 is connected to the READ input terminal 32, thereby causing the information stored in latch 34 to be stored in latch 35 on the falling edge of the READ signal. Thus, latch 35 always retains the status signal value D' which has been actually provided on status bit output terminal 43. Furthermore, the Q output lead of latch 34 is connected to the input lead of three state device 42 and in turn provides the D' output bit on output lead 43 when three state device 42 is enabled by a logical one READ signal. Output device 42 and output device 44 are enabled in response to a logical one READ signal on terminal 32, and are in a high impedance state in response to a logical zero READ signal.

The data input signal D applied to input terminal 31 is applied to one input lead of exclusive OR gate 36, and the information stored in latch 35 (i.e., the previous data information received on input terminal 31) is applied to the other input lead of exclusive OR gate 36. Exclusive OR gate 36 thus provides on its output lead a signal indicating whether the present data input signal on terminal 31 is the same as the previously received and read data signal on input lead 31. If the present data input signal and the previous data input signal are identical, the output lead from exclusive OR gate 36 is a logical zero. Conversely, when the present data input signal and the previous data input signal differ, the output signal from exclusive OR gate 36 is a logical one. The output signal from exclusive OR gate 36 is applied to the S input lead of the RS flip-flop formed by cross-coupled NOR gates 37 and 38. Input terminal 39 serves as an external reset R for the RS flip-flop in the event that it is desired to reset the RS flip-flop to have a logical zero output signal, for example when the circuit 30 is initialized. The output signal of the RS flip-flop is provided on the output lead of NOR gate 38 and is the same as the output signal from exclusive OR gate 36. Thus, the output signal from exclusive OR gate 36 is stored by the RS flip-flop formed by NOR gates 37 and 38, is applied to the D input lead of latch 41, and is stored in latch 41 in response to a logical one READ signal received on input terminal 32. Thus, latch 41 stores the delta signal which in turn is provided on the Q output lead of latch 41 to the input lead of three state device 44. The delta signal Δ is provided on output lead 45 of three state device 44 when three state device 44 is enabled by a logical one READ signal. Furthermore, the delta bit provided on the Q output lead of latch 41 is provided to the enable input lead E of latch 34, thereby causing the present input data stored in latch 33 to fall through latch 34 when the present data input signal differs from the previous data input signal (i.e., when the delta signal is a logical one). Of importance, by not always shifting the present input data signal into latch 34, latch 34 provides valid output data to three state device 42 even when the input data applied to input terminal 31 has changed just before or during a read operation invoked by a logical one READ signal on terminal 32.

The Q output signal from latch 41 is also applied to one input lead of AND gate 40, whose other input lead receives the READ signal from terminal 32. AND gate 40 thus provides a reset signal to reset the output bit from the RS flip-flop formed by NOR gates 37 and 38 to a logical zero when logical one delta signal is provided to the input lead of three state device 44.

In contrast to prior art circuits, the circuit 30 of FIG. 3 does not use a one shot. The output signal of exclusive OR gate 36 provides the "set" input signal to the RS flip-flop 37, 38 as long as the present input data differs from the previous input data. Therefore, this "set" signal is a steady, well defined signal, rather than the variable length and variable width pulse which is provided by the one shot used in the prior art.

In accordance with the teachings of this invention, race conditions are avoided. A logical one READ signal causes latches 33 and 41 to store the present input data signal and the present delta value, respectively. The delta value stored in latch 41 is then directly applied to output terminal 45 through three state buffer 44. The delta value stored in latch 41 is also used to determine what data is provided on output terminal 43 of three state buffer 42. When the delta signal stored in latch 41 is a logical zero, signifying no change in input data, the previous input data stored within latch 34 is provided to output terminal 43 via three state buffer 42. Conversely, when the delta value stored in latch 44 is a logical one, signifying a change in input data, the new input data, stored by latch 33, is passed through latch 34 and thereby provided to output terminal 43 via three state buffer 42. Thus the status information and delta information provided to output terminals 43 and 45, respectively, cannot contradict, nor can they change during a read operation.

Furthermore, a logical one delta bit cannot be missed. The RS flip flop 37, 38 is cleared only when a logical one delta signal is provided on output terminal 45 via enabled three state buffer 44. Also, the status value D' that is provided to output terminal 43 via three state buffer 42 is stored in latch 35. Then, even if the input data D changes shortly before, during, or after the read operation, its present value is compared by exclusive OR gate 36 with the latched, previously read value. Thus, a change in input data always causes the delta signal to be set to a logical one regardless of when, relative to a read operation, it occurs.

Figure 4:
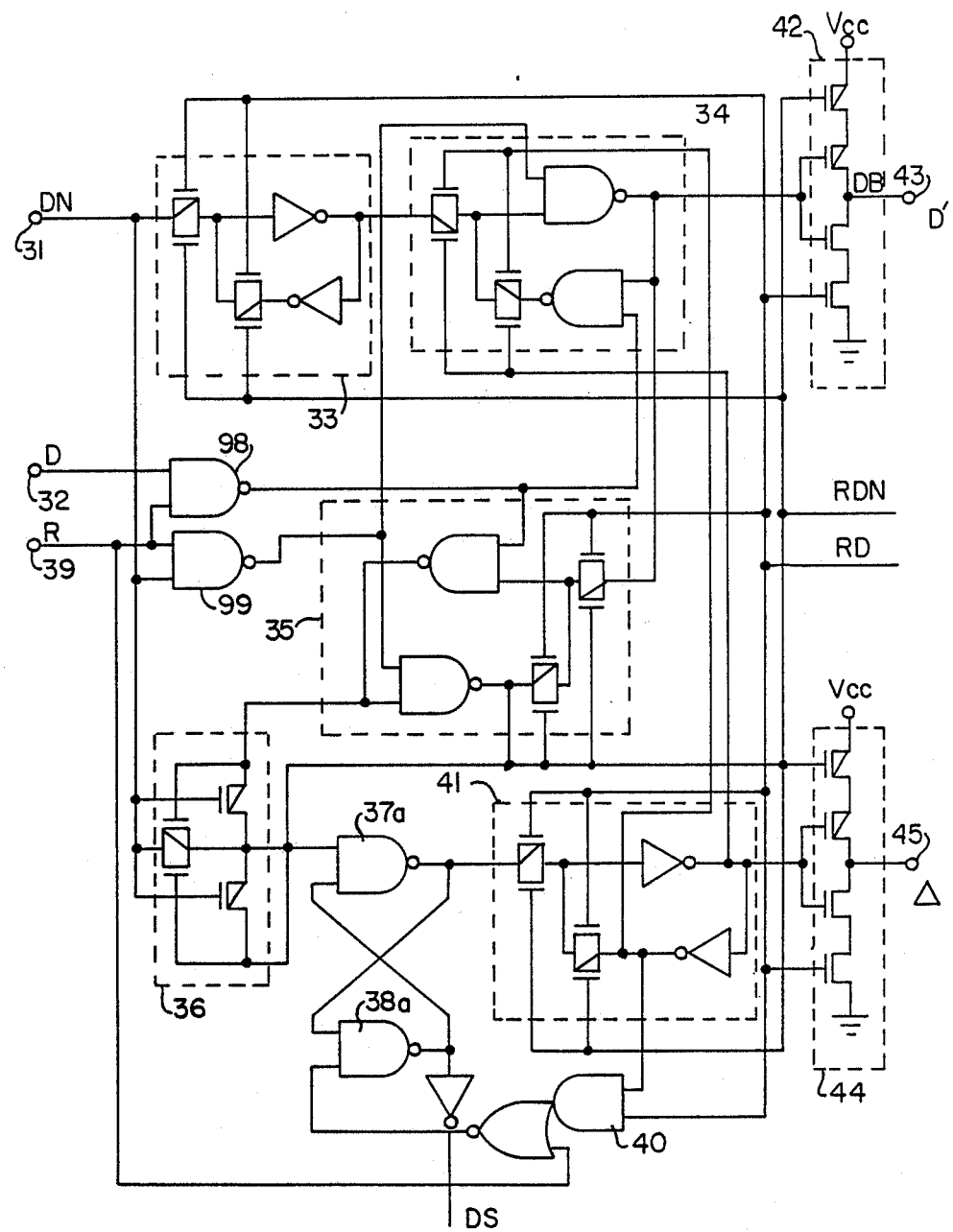
FIG. 4 is a more detailed circuit diagram of the circuit of FIG. 3.

FIG. 4 depicts a more detailed schematic diagram of the embodiment of this invention shown in FIG. 3. The dashed lines depict circuit elements shown in FIG. 3 and are numbered the same as their corresponding circuit blocks shown in FIG. 3. Thus, for example, latch 33 includes two inverters and two transmission gates, each transmission gate comprising a P channel MOS transistor and N channel MOS transistor, the P channel MOS transistor being indicated by a diagonal line extending from the source to drain. Some differences between FIG. 3 and FIG. 4 can be observed. It is easier to make an inverting structure than a noninverting structure in CMOS, so three state inverting buffers are shown in FIG. 4. By use of Demorgan's rule in Boolean algebra, as applied to digital logic circuits, the cross-coupled NOR gates 37, 38 forming the RS flip flop of FIG. 3 are converted to the cross-coupled NAND gates 37a, 38a to form the $\overline{RS}$ latch of FIG. 4. The use of inverters in associated circuitry (not shown) external to the circuit of FIG. 4 allows selected signals to be provided with their inverses, through additional interconnect lines. Thus, DN is the inverse of the input data signal D, RDN is the inverse of the READ signal RD, Also, two NAND gates 98, 99 have been added, each having one input lead connected to reset signal R. NAND gate 98 has its other input lead connected to the D input signal; NAND gate 99 has its other input lead connected to the DN input signal. The output lead of NAND gate 98 is connected to the set input leads of latches 34 and 35. The output lead of NAND gate 99 is connected to the reset input leads of latches 34 and 35. This has the effect of preloading the present input data D into latches 34, 35 when the circuit is reset.

Figure 5:
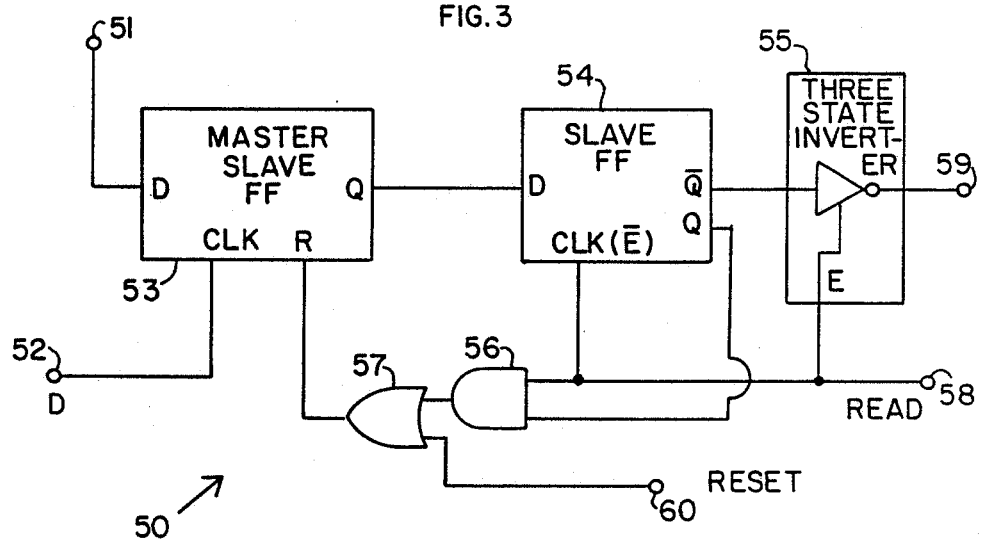
FIG. 5 is a schematic diagram of a simpler, yet related embodiment of this invention.

FIG. 5 depicts another circuit constructed in accordance with the present invention. Circuit 50 serves to provide a logical one output signal on output terminal 59 in response to a rising edge (0 to 1 transition) of the input data signal D on input lead 52.

This is accomplished without the use of a one shot, and thus avoids the reliability problems associated with prior art circuits. Since this circuit provides only a single output signal, this circuit is not concerned with the contradiction and race condition problems which the circuit of FIG. 4 addresses.

As shown in FIG. 5, resettable D type flip flop 53 has its D input lead 51 connected to a constant logical one level, such as a 5 volt supply. The input data signal D is applied to the clock (CLK) input lead of flip flop 53. The Q output lead of flip flop 53 is connected to the D input lead of flip flop 54. Flip flop 54 allows the data stored within latch 53 to fall through latch 54 when the READ signal is low (inactive). The $\overline{Q}$ output signal from flip flop 54 is provided to output terminal 59 via three state inverter 55 in response to a logical one READ signal, which also closes latch 54. Flip flop 53 is reset (Q=0) in response to a logical one output signal from OR gate 57. This occurs in response to a logical one RESET signal on lead 60, or in response to a logical one Q output signal from flip flop 54 during a read operation in response to a logical one READ signal on terminal 58, in which event a logical one output signal is provided by AND gate 56.

When the data input signal D has a rising edge, the logical one signal on lead 51 is stored in flip flop 53, thereby providing a logical one Q output signal from flip flop 53. Flip Flop 53 retains this logical one, even if the input data D goes low again. Then, when the READ signal becomes a logical one, the logical one Q output signal from flip flop 53 is stored in flip flop 54. In turn, a logical zero $\overline{Q}$ output signal from flip flop 54 is applied to the input lead of three state inverter 55, thus providing a logical one output signal on lead 59. Also, during this read operation, flip flop 53 is reset to store a logical zero.

Figure 6:
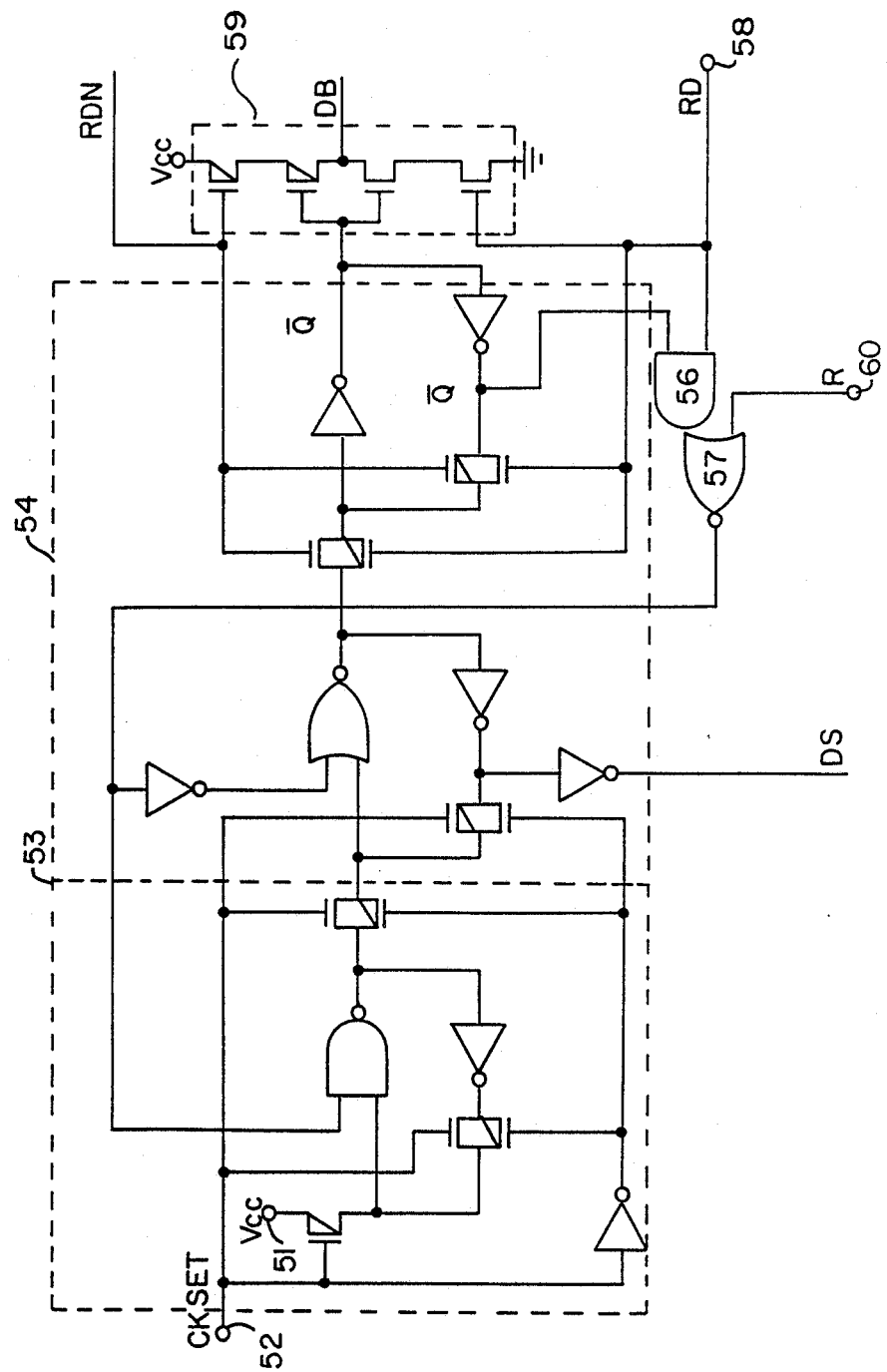
FIG. 6 is a more detailed circuit diagram of the circuit of FIG. 5.

FIG. 6 shows a more detailed schematic diagram of one embodiment of the circuit of FIG. 5, with portions labeled with numbers corresponding to those used in FIG. 5.

While this specification illustrates specific embodiments of this invention, it is not to be interpreted as limiting the scope of the invention. Many embodiments of this invention will become evident to those of ordinary skill in the art in light of the teachings of this specification.

I claim:

1. A structure for receiving a series of input data signals and providing an output status signal identical to the input data signal and providing an output delta signal indicating if the present input data signal is the same as the previous input data signal, said structure comprising:

- an input terminal for receiving said input data signal;
- a read enable input terminal for receiving a read enable signal;
- a status signal output terminal for providing said output status signal;
- a delta signal output terminal for providing said output delta signal;
- first means for storing said input data signal, having an input terminal, an enable terminal, and having an output terminal coupled by buffer means to said status signal output terminal;
- second means for storing said previous input data signal, having an input terminal connected to said output terminal of said first means for storing, having an output terminal, and having an enable terminal connected to said read enable terminal;
- exclusive or means for comparing said input data signal with said previous input data signal stored within said second means for storing, and providing a comparison signal on its output lead indicating if said input data signal is identical to said previous input data signal;
- third means for storing said comparison signal, comprising a flip flop and latch combination, said flip flop having a set lead connected to said output lead of said exclusive or means and an output lead connected to the input lead of said latch, said latch further having an enable terminal connected to said read enable terminal, and having an output lead connected to said enable terminal of said first means for storing said output lead further being coupled by buffer means to said delta signal output terminal;
- fourth means for storing having an input terminal connected to said input terminal of said structure, an output terminal connected to said input terminal of said first means for storing and an enable terminal connected to said read enable terminal; and
- and gate means having a first input lead connected to said output lead of said latch of said third means for storing, a second input lead connected to said read enable terminal, and an output lead coupled to said reset terminal of said latch of said third means for storing for enabling said first means for storing in response to said comparison signal, thereby storing said input data signal in said first means for storing only when said input data signal and said previous input data signal are different.

2. The structure as in claim 1 which further comprises:

- a first three state buffer having an input lead connected to said output lead of said first means for storing, an output lead connected to said status signal output terminal, and an enable input lead connected to said READ ENABLE input lead; and
- a second three state buffer having an input lead connected to said output lead of said third means for storing, an output lead connected to said delta signal output terminal, and an enable input lead connected to said READ ENABLE input lead.

* * * * *